(12) United States Patent
ReFraschini et al.

(10) Patent No.: US 7,951,461 B2
(45) Date of Patent: May 31, 2011

(54) GAS-BARRIER SHRINK FILMS AND THEIR USE IN DEEP-DRAWING APPLICATIONS

(75) Inventors: Marco ReFraschini, Nerviano (IT); Felice Ursino, RHO (IT); Mario Paleari, Pogliano (IT)

(73) Assignee: Cryovac, Inc., Duncan, SC (US)

(*) Notice: Subject to any disclaimer, the term of this patent is extended or adjusted under 35 U.S.C. 154(b) by 1135 days.

(21) Appl. No.: 11/708,836

(22) Filed: Feb. 21, 2007

(65) Prior Publication Data

US 2007/0212550 A1    Sep. 13, 2007

(30) Foreign Application Priority Data

Feb. 28, 2006 (EP) .................................. 06004057

(51) Int. Cl.
*B32B 27/00* (2006.01)
*B32B 27/08* (2006.01)
(52) U.S. Cl. ...................... 428/500; 428/515
(58) Field of Classification Search ................ None
See application file for complete search history.

(56) References Cited

U.S. PATENT DOCUMENTS

| | | |
|---|---|---|
| 3,956,867 A | 5/1976 | Utz et al. |
| 4,399,181 A | 8/1983 | Yoshimura et al. |
| 4,958,480 A | 9/1990 | Warner |
| 5,622,780 A | 4/1997 | Paleari |
| 6,153,308 A * | 11/2000 | Oya et al. .................. 428/515 |
| 6,406,763 B1 | 6/2002 | Wolf et al. |
| 2003/0012900 A1 | 1/2003 | Wolf et al. |
| 2005/0173289 A1 | 8/2005 | Natterer et al. |
| 2005/0235611 A1 | 10/2005 | Roussos |
| 2006/0115667 A1 | 6/2006 | Verrocchi |
| 2006/0254218 A1 | 11/2006 | Yamamoto et al. |

FOREIGN PATENT DOCUMENTS

EP    1 084 034    9/2004

OTHER PUBLICATIONS

BASF, "The First Styrenic TPE* from BASF", Oct. 1998, 2 pages.
Ron Sheu, "Styrolux® Clear & Tough SBC Resin", www.basf.com, Jun. 8, 2005, 33 pages.
Chemical Market Resources Inc., "BASF to Launch New TPE grade, Oppanol IBS®", Global PO & E, vol. 2, Issue 17, Aug. 23, 2004, pp. 1,11-12.
"Styroflex® 2G 66", BASF, Feb. 7, 2003, 4 pages.
"Styrenics", www.basf.de, 2002, 2 pages.
"Styrolux and Styroflex", www.corporate.basf.com, Aug. 23, 2004, 6 pages.
Robert Huber, "Efficient production of transparent thin films", Trade press conference K 2004, Jun. 22 & 23, 2004, 9 pages.
"Styroflex® 2G 66", BASF, May 2003, 2 pages.
"Styroflex / Styrolux / GPPS Sheet Blend Data", Dec. 9, 2003, 1 page.
Keith A. Edwards, "Styroflex® 2G 66 SBS Block Copolymer with Unique Structure and Properties", Aug. 26, 2004, 45 pages.
Chevron Phillips Chemical Company, "K-Resin Styrene-Butadiene Copolymers", Technical Service Memorandum #322, 2002, 12 pages.
www.convertingmagazine.com, "Resins, flexibles are Pack Expo show standouts", Nov. 4, 2002, 3 pages.
European Search Report (2 pages), and Communication re: European Search Opinion (5 pages) for EP 06004057, mailed Jul. 3, 2006.

* cited by examiner

*Primary Examiner* — Sheeba Ahmed
(74) *Attorney, Agent, or Firm* — Mark B. Qüatt

(57) ABSTRACT

A multi-layer, gas-barrier, biaxially oriented and heat-shrinkable film includes a first outer heat-sealable layer, an inner gas-barrier layer, and a second outer abuse resistant layer, the film containing at least 28%, by weight of the film, of polystyrene polymer, such as a high styrene styrene-butadiene block copolymer. The polystyrene copolymer can be present in the second outer abuse-resistant layer, and/or in one or more inner layers positioned between the first outer heat-sealable layer and the inner gas-barrier layer, and/or in one or more inner layers positioned between the gas-barrier layer and the second outer abuse layer. The film of the invention is particularly suitable to be deep-drawn to form a flexible container in a packaging process where the final vacuum lidded package is heat-shrunk.

12 Claims, 3 Drawing Sheets

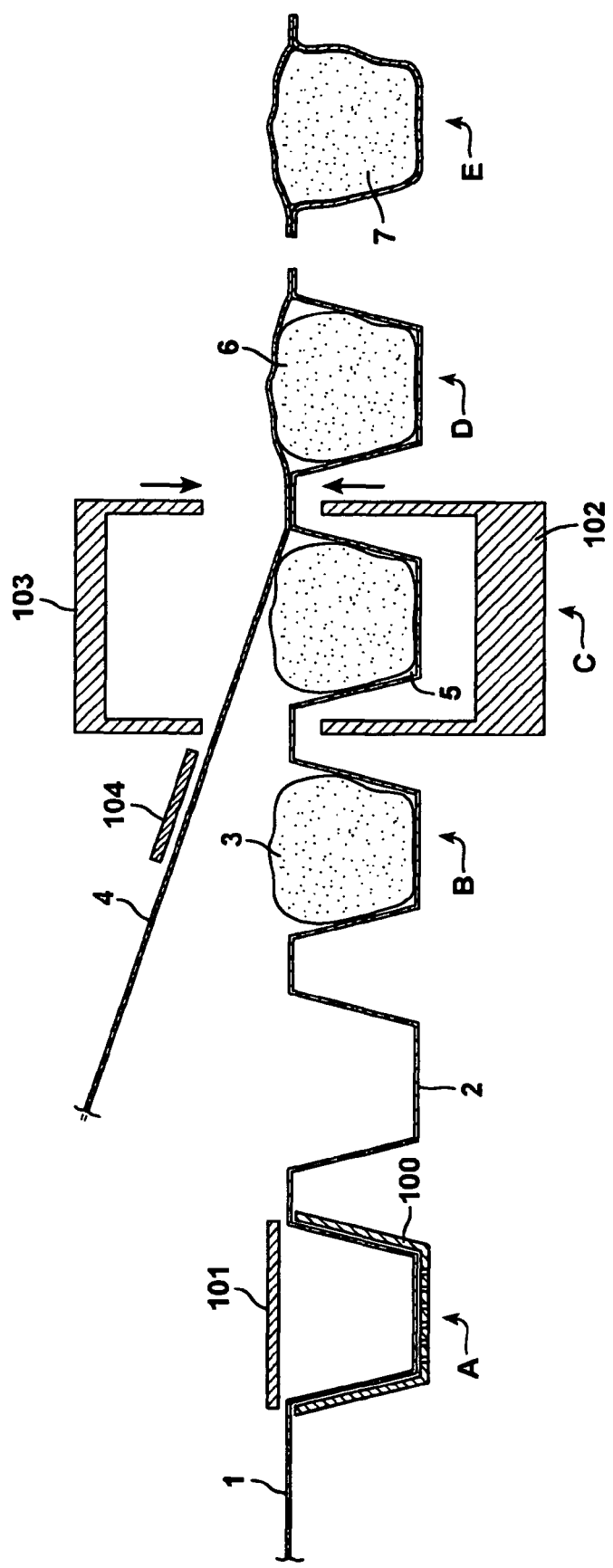

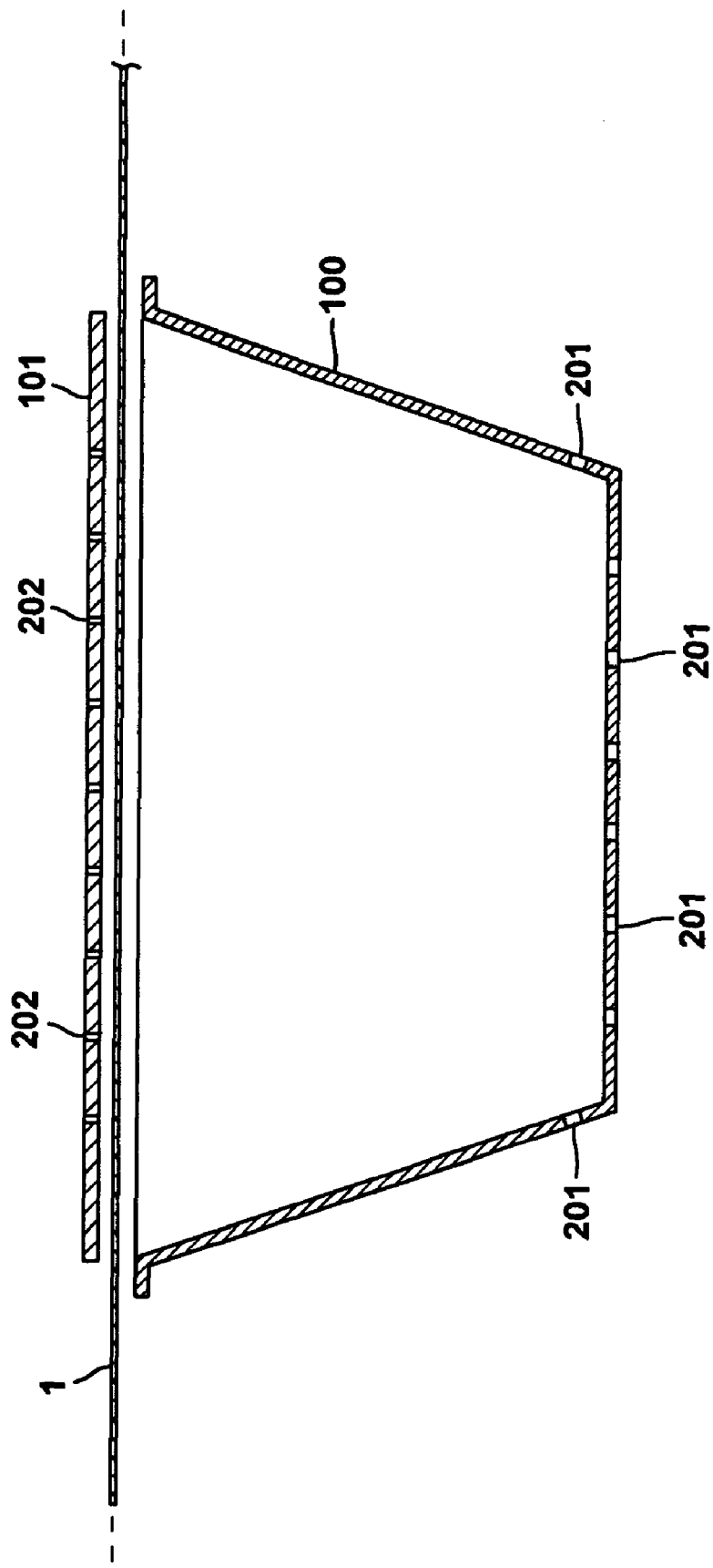

GAS-BARRIER SHRINK FILMS AND THEIR USE IN DEEP-DRAWING APPLICATIONS

The present application claims the benefit under 35 U.S.C. §119 of European Patent Application No. 06004057 filed Feb. 28, 2006.

FIELD OF THE INVENTION

The present invention relates to shrink films, and more particularly to gas-barrier oriented heat-shrinkable films that are particularly useful for deep-drawing applications and to the packaging processes where these films are deep-drawn.

BACKGROUND OF THE INVENTION

There are several packaging processes known in the literature and recently applied in industry, particularly in the food industry, that involve the deep-drawing of an oriented heat-shrinkable film to form a flexible container. In these methods the product to be packaged is loaded in the container thus obtained, and the package is then closed, once air is evacuated from the inside, with a lid, which may be e.g., a flat film, another deep-drawn flexible container, or a stretched film, that is sealed to the flange of the loaded container. Shrinkage of the packaging material, induced by a heat-treatment, then provides the desired tight appearance to the end vacuum package.

Examples of these methods are for instance those described in DE-A-2,364,565, in US 2005/0173289, or in EP-A-1,557,372.

These methods vary in certain respects, such as the use of a lid which may or may not be heat-shrinkable, may or may not be deep-drawn or may or may not be stretched over the product, and in the manner the package is shrunk, e.g., heating only the deep-drawn container or the whole package, carrying out the heat-shrinking step on the end package exiting the vacuum chamber, or carrying out the heat-shrinking step while the package is still in the vacuum chamber, before or after it is sealed.

These new methods essentially differ from the conventional deep-drawing packaging methods, in the use of a heat-shrinkable flexible film, typically with a thickness in the range of from 40 to 160 μm, instead of a conventional, thicker, non heat-shrinkable laminate. The advantages offered thus mainly reside in the highly reduced amount of packaging material employed and in the improved pack appearance that makes the product more appealing.

The first step, which is common to all the above processes, involves deep-drawing an oriented heat-shrinkable film to form a flexible container, e.g., a sort of a pouch or pocket of the size and dimensions desired and set by the specific mould employed.

Said step which is the key step in all these processes is also the most problematic one, particularly if a large depth, e.g. 60, 80, 100 or more mm, is desired for the container.

The oriented heat-shrinkable film that is used in said thermoforming step must have many attributes to be fit-for-use in these processes:
  i) it must be formable to the desired depths and the definition of the container formed should correspond as much as possible to the shape of the mould;
  ii) it must have high mechanical properties so that the end package, where the thickness of the packaging material is reduced by the forming step, still has the necessary abuse resistance;
  iii) once thermoformed, the film must show a certain minimum % free shrink in both directions and a certain shrink tension to guarantee that after the shrink step, that is carried out at temperatures that do not negatively affect the packaged product, the package appearance is as tight as desired;
  iv) at the same time however it should not give the so-called "shrink back" effect, and the container formed will have to maintain as much as possible the size given by the mould; and
  v) it should have good optical properties after deep drawing and shrinkage.

It has been found that the heat-shrinkable films presently used for shrink packaging applications, such as shrink bags or shrink FFS processes, are not fit-for-use for the new "thermoform-shrink" processes as they do not meet most of the above requirements.

The present invention addresses this problem and is directed to an oriented heat-shrinkable film that has the attributes listed above and can thus be suitably employed i.a., in the new "thermoform-shrink" processes.

SUMMARY OF THE INVENTION

In a first aspect, the present invention is a multi-layer, gas-barrier, biaxially oriented and heat-shrinkable film comprising:
  a) a first outer heat-sealable layer;
  b) an inner gas-barrier layer; and
  c) a second outer abuse resistant layer;
said film being characterized in that it contains at least 28%, by weight of the film, of polystyrene polymer.

In one embodiment the polystyrene polymer, either as a single polymer or as a blend of different polystyrene polymers, is present in one or more layers which are not the first outer heat-sealable layer a) or the gas-barrier layer b). Thus the polystyrene polymer is in one embodiment present in the second outer abuse-resistant layer c) and/or in one or more inner layers positioned between the first outer heat-sealable layer a) and the inner gas-barrier layer b) and/or in one or more inner layers positioned between the gas-barrier layer b) and the second outer abuse layer c).

The term "polystyrene polymer" as used in this description and claims refers to film grade homopolymers and copolymers of styrene and its analogs and homologs, including α-methyl-styrene and ring-substituted styrenes, such as for instance ring-methylated styrenes.

This term "polystyrene polymer" is used to identify single polymers or blends of different polystyrene polymers as indicated above. When more than one layer of the film contain "polystyrene polymer", said single polymer or polymer blend may be different in the different layers.

In a second aspect the present invention is a process for packaging a product comprising deep-drawing an oriented heat-shrinkable film to form a flexible container, loading the product to be packaged in the thus formed container, evacuating and closing the container by means of a lid sealed to the flange of the container and subjecting the obtained vacuum package to a heat-shrinking step, wherein the oriented heat-shrinkable film which is deep-drawn comprises the film of the first aspect.

In a third aspect the present invention is a shrunk package obtained by the process of the second aspect.

These and other aspects, advantages, and features of the invention will be more readily understood and appreciated by reference to the detailed description of the invention and the drawings.

Definitions

As used herein, the phrases "inner layer" and "internal layer" refer to any film layer having both of its principal surfaces directly adhered to another layer of the film.

As used herein, the phrase "outer layer" refers to any film layer having only one of its principal surfaces directly adhered to another layer of the film As used herein, the phrases "seal layer", "sealing layer", "heat seal layer", and "sealant layer", refer to the film outer layer which will be involved in the sealing of the film to close the package and that will thus be in contact with the packaged product.

As used herein, the phrase "tie layer" refers to any inner film layer having the primary purpose of adhering two layers to one another.

As used herein, the phrase "machine direction", herein abbreviated "MD", refers to a direction "along the length" of the film, i.e., in the direction of the film as the film is formed during extrusion and/or coating; also called "longitudinal direction".

As used herein, the phrase "transverse direction", herein abbreviated "TD", refers to a direction across the film, perpendicular to the machine or longitudinal direction.

As used herein, the term "orientation" refers to the process of solid-state orientation, i.e., the orientation process carried out at a temperature higher than the highest Tg (glass transition temperature) of the resins making up the majority of the structure and lower than the highest melting point of at least some of the film resins, i.e. at a temperature at which at least some of the resins making up the structure are not in the molten state. Thus, as used herein, the term "oriented" when referred to the films of the invention refers to films obtained by either coextrusion, extrusion coating or lamination of the resins of the different layers to obtain a primary thick sheet or tube (primary tape) that is quickly cooled to a solid state and then reheated to the so-called orientation temperature and thereafter biaxially stretched using either a tubular orientation process (for example a trapped bubble method) or a simultaneous or sequential tenter frame process.

As used herein the phrases "heat-shrinkable," "heat-shrink," and the like, refer to the tendency of the film to shrink upon the application of heat, i.e., to contract upon being heated, such that the size of the film decreases while the film is in an unrestrained state. As used herein said term refer to oriented films with a free shrink in each of the machine and the transverse directions, as measured by ASTM D 2732, of at least 5% at 95° C.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to a polymer formed by the polymerization reaction of at least two different monomers. When used in generic terms the term "copolymer" is also inclusive of, for example, ter-polymer. The term "copolymer" is also inclusive of random copolymer, block copolymer, and graft copolymer.

As used herein, the term "polymer" is inclusive of homopolymer, and copolymer.

As used herein, the phrase "heterogeneous polymer" refers to a polymerization reaction product of relatively wide variation in molecular weight and relatively wide variation in composition distribution, i.e., a typical polymer prepared, for example, using conventional Ziegler-Natta catalysts.

As used herein, the phrase "homogeneous polymer" refers to a polymerization reaction product of relatively narrow molecular weight distribution and relatively narrow composition distribution. This term includes a homogeneous polymer prepared using a metallocene, or other single-site type catalyst.

As used herein, the term "polyolefin" refers to any polymerized olefin, which can be linear, branched, cyclic, aliphatic, aromatic, substituted, or unsubstituted. More specifically, included in the term polyolefin are homopolymer of olefin, copolymer of olefin, copolymer of an olefin and an non-olefinic comonomer copolymerizable with the olefin, such as vinyl monomer, modified polymer thereof, and the like. Specific examples include polyethylene homopolymer, polypropylene homopolymer, polybutene homopolymer, ethylene-α-olefin copolymer, propylene-α-olefin copolymer, butene-α-olefin copolymer, ethylene-unsaturated ester copolymer, ethylene-unsaturated acid copolymer, (e.g. ethylene-ethyl acrylate copolymer, ethylene-butyl acrylate copolymer, ethylene-methyl acrylate copolymer, ethylene-acrylic acid copolymer, and ethylene-methacrylic acid copolymer), ethylene-vinyl acetate copolymer, ionomer resin, polymethylpentene, etc.

As used herein the term "modified polyolefin" is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It is also inclusive of modified polymer obtained by incorporating into the olefin homo-polymer or copolymer, by blending or in one embodiment by grafting, an unsaturated carboxylic acid, e.g., maleic acid, fumaric acid or the like, or a derivative thereof such as the anhydride, ester or metal salt or the like.

As used herein, the term "adhered", as applied to film layers, broadly refers to the adhesion of a first layer to a second layer either with or without an adhesive, a tie layer or any other layer therebetween, and the word "between", as applied to a layer expressed as being between two other specified layers, includes both direct adherence of the subject layer to the two other layers it is between, as well as a lack of direct adherence to either or both of the two other layers the subject layer is between, i.e., one or more additional layers can be imposed between the subject layer and one or more of the layers the subject layer is between.

In contrast, as used herein, the phrase "directly adhered" is defined as adhesion of the subject layer to the object layer, without a tie layer, adhesive, or other layer therebetween.

As used herein the term "gas-barrier" when referred to a layer, to a resin contained in said layer, or to an overall structure, refers to the property of the layer, resin or structure, to limit to a certain extent passage through itself of gases.

When referred to a layer or to an overall structure, the term "gas-barrier" is used herein to identify a layer or structure characterized by an Oxygen Transmission Rate (evaluated at 23° C. and 0% R.H. according to ASTM D-3985) of less than 500 cm$^3$/m$^2$.day.bar.

As used herein the terms "polyolefin layer" or "polystyrene polymer layer" refer to a layer comprising a major proportion, i.e. greater than 50 wt. %, by weight of the layer, of polyolefin or polystyrene polymer respectively.

As used herein "deep-drawing" is used to indicate in general a process of shaping a heated thermoplastic film in a mould to form a container, with no particular ratio between the dimensions of the mould being required.

BRIEF DESCRIPTION OF THE DRAWINGS

FIG. 4 is a schematic representation illustrating the packaging process in which the film of the invention can suitably be employed;

FIG. 5 is a schematic view of the deep-drawing station used in the packaging process of FIG. 4.

DETAILED DESCRIPTION OF THE INVENTION

Figure 1:
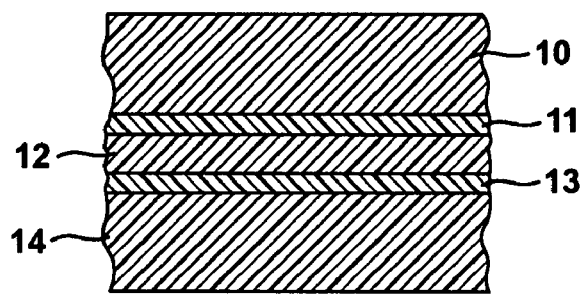
FIG. 1 illustrates an enlarged cross-sectional view of a first film of the present invention.

In one embodiment the present invention is a multi-layer, gas-barrier, biaxially oriented and heat-shrinkable film comprising
- a) a first outer heat-sealable layer
- b) an inner gas-barrier layer, and
- c) a second outer abuse resistant layer said film being characterized in that it contains at least 28% by weight of polystyrene polymer.

The term "polystyrene polymer" as used in this description and claims refers to film grade homopolymers of styrene or its analogs or homologs, including α-methyl-styrene and ring-substituted styrenes, such as for instance ring-methylated styrenes, copolymers of styrene or its analogs or homologs, with α-olefins or conjugated dienes, their hydrogenated derivatives and the modified derivatives of said homo- and copolymers. Styrene copolymers specifically include heterogeneous and homogeneous ethylene-styrene copolymers, block copolymers comprising styrene and conjugated dienes, such as isoprene or, in one embodiment, butadiene, with different types of block structures, morphologies, and monomer ratios, and their hydrogenated derivatives. Specific examples of styrene block copolymers are styrene-butadiene copolymer (SBC), styrene-butadiene-styrene terpolymer, and styrene-isoprene-styrene terpolymer, and examples of their hydrogenated derivatives are SEBS or SEPS polymer.

The block copolymers of styrene and butadiene may include those copolymers where the major proportion is of the butadiene component such as for instance those commercially available under the trademark STYROFLEX® by BASF or KRATON® by Kraton Polymers. Styrene-butadiene copolymers according to the present invention can be block copolymers of styrene and butadiene comprising a major proportion of styrene, e.g. those with a butadiene content comprised between 5 and 45 wt. %, or between 10 and 40 wt. %, and conversely a content of between 55 and 95 wt. %, e.g. between 60 and 90 wt. % of styrene, based on the weight of the entire block copolymer. They may be linear or star-shaped branched copolymers, and are commercially available under the trademark STYROLUX® by BASF, FINA-CLEAR® by Fina, K-RESIN® by Phillips Petroleum and others.

Modified styrene homo-polymers and copolymers typically refer to the styrene homo- and copolymers modified with an unsaturated carboxylic acid, e.g., maleic acid, fumaric acid or the like, or a derivative thereof such as the anhydride, ester or metal salt.

In one embodiment at least part of the amount of the polystyrene polymer contained in the film according to the present invention is in the form of a styrene-butadiene copolymer, and in one embodiment of a styrene-butadiene copolymer with a high styrene content.

In one embodiment at least 50 wt. % of the total amount of polystyrene polymer in the film is in the form of a styrene-butadiene copolymer, and in one embodiment of a styrene-butadiene copolymer with a high styrene content.

In another embodiment 60 wt. %, 70 wt. %, 80 wt. % or 90 wt. % of the total amount of polystyrene polymer is in the form of a styrene-butadiene copolymer, such as of a styrene-butadiene copolymer with a high styrene content.

In one embodiment the total amount of polystyrene polymer is in the form of a styrene-butadiene copolymer such as of a styrene-butadiene copolymer with a high styrene content.

In another embodiment the polystyrene polymer is formed by styrene-butadiene copolymers as described above, GPPS (general purposes polystyrene), HIPS (high impact polystyrene or rubber modified polystyrene) and modified polystyrene.

When more than one layer of the film contain "polystyrene polymer", the composition of said layers may be equal or different.

In one embodiment the "polystyrene polymer" layer or layers present in the film according to the present invention can comprise at least 80 wt. %, such as at least 90 wt. %, or at least 95 wt. % of polystyrene polymers.

In one embodiment said layer(s) can essentially consist of polystyrene polymers.

The first outer layer a) that in the end package will be the inside, heat-sealable, layer of the package, will comprise one or more heat-sealable polyolefins.

In one embodiment polymers for said layer are selected from ethylene homopolymers, ethylene copolymers, propylene copolymers and blends thereof.

Ethylene homo- and copolymers particularly suitable for the first outer layer a) are selected from ethylene homopolymer (polyethylene), heterogeneous or homogeneous ethylene-α-olefin copolymer, ethylene-cyclic olefin copolymer, such as ethylene-norbornene copolymer, ethylene-vinyl acetate copolymer, ethylene-($C_1$-$C_4$) alkyl acrylate or methacrylate copolymer, such as ethylene-ethyl acrylate co-polymer, ethylene-butyl acrylate copolymer, ethylene-methyl acrylate copolymer, and ethylene-methyl methacrylate copolymer, ethylene-acrylic acid copolymer, ethylene-methacrylic acid copolymer, and blends thereof in any proportion.

Ethylene homo- and copolymers for said first outer layer a) are e.g. polyethylene having a density of from about 0.900 g/cm$^3$ to about 0.950 g/cm$^3$, heterogeneous and homogeneous ethylene-α-olefin copolymer having a density of from about 0.880 g/cm$^3$ to about 0.945 g/cm$^3$, e.g. from about 0.885 g/cm$^3$ to about 0.940 g/cm$^3$, or of from about 0.890 g/cm$^3$ to about 0.935 g/cm$^3$, optionally blended with a small amount of an ethylene-norbornene copolymer, and ethylene-vinyl acetate copolymer comprising from about 3 to about 28 wt. %, e.g. from about 4 to about 20%, or from about 4.5 to about 18% vinyl acetate comonomer, and blends thereof.

Ethylene homo- and copolymer for said first outer layer a) can be selected from heterogeneous ethylene-α-olefin copolymer having a density of from about 0.890 g/cm$^3$ to about 0.940 g/cm$^3$, homogeneous ethylene-α-olefin copolymer having a density of from about 0.890 g/cm$^3$ to about 0.925 g/cm$^3$, ethylene-vinyl acetate copolymer comprising from about 4.5 to about 18% vinyl acetate comonomer, and blends thereof.

In one embodiment of the present invention the first outer layer a) comprises a blend of at least two different ethylene-α-olefin copolymers with a density of from about 0.890 g/cm$^3$ to about 0.935 g/cm$^3$, or a blend of a homogeneous and a heterogeneous ethylene-α-olefin copolymer, optionally blended with a small amount of ethylene-norbornene copolymer, and ethylene-vinyl acetate copolymer.

The ethylene homo- or copolymer for said first outer layer a) can have a melt index of from about 0.3 to about 10 g/10 min, such as from about 0.5 to about 8 g/10 min, from about 0.8 to about 7 g/10 min, or from about 1 to about 6 g/10 min (as measured by ASTM D1238-190° C., 2.16 kg).

Propylene copolymer suitable for the first outer layer a) can be propylene co- and ter-polymer with up to 50 wt. %, e.g. up to 35 wt. %, of ethylene and/or a ($C_4$-$C_{10}$)-α-olefin, and blends thereof in any proportion.

Propylene copolymer for said first outer layer a) can be propylene-ethylene co-polymer, propylene-ethylene-butene copolymer and propylene-butene-ethylene copolymer, with a total ethylene and butene content lower than about 40 wt. %, lower than about 30 wt. %, or lower than about 20 wt. % by weight of the copolymer.

Propylene copolymer can have a melt index of from about 0.5 to about 20 g/10 min, from about 0.8 to about 12 g/10 min, or from about 1 to about 10 g/10 min (as measured by ASTM D1238-230° C., 2.16 kg).

Said first outer layer a) may also contain a blend of one or more ethylene homo- and/or copolymers with one or more propylene copolymers, in any proportion.

Said first outer layer in one embodiment comprises an ethylene homo- or copolymer.

Said first outer layer a) can also comprise a blend of a major proportion of one or more of ethylene homo- and copolymers and propylene copolymers, with a minor proportion of one or more other polyolefins and/or modified polyolefins, such as polybutene homo-polymer, butene-($C_5$-$C_{10}$)-α-olefin copolymer, anhydride grafted ethylene-α-olefin copolymer, anhydride grafted ethylene-vinyl acetate copolymer, rubber modified ethylene-vinyl acetate copolymer, ethylene/propylene/diene (EPDM) copolymer, and the like.

Said additional polymers may be blended with the basic polymers of said first outer layer in an amount that is typically up to about 40% by weight, up to about 30% by weight, up to about 20% by weight, or up to about 10% by weight of the polymer blend.

Said outer layer a) in one embodiment can in one embodiment consist essentially of one or more of ethylene homo- and copolymer.

The thickness of said first outer layer a) is generally higher than about 10% of the overall thickness of the structure, such as higher than about 12%, between about 15 and about 50%, or between about 18 and about 40% of the overall thickness of the film.

The inner gas-barrier layer b) comprises at least one gas barrier resin generally selected from vinylidene chloride copolymer (PVDC), ethylene-vinyl alcohol copolymer (EVOH), polyamide or copolyamide, acrylonitrile-based copolymer, or a blend of EVOH with polyamide or copolyamide.

"PVDC" includes a copolymer of vinylidene chloride and at least one mono-ethylenically unsaturated monomer copolymerizable with vinylidene chloride. The mono-ethylenically unsaturated monomer may be used in a proportion of 2 to 40 wt. %, e.g. 4 to 35 wt. %, of the PVDC. Examples of the mono-ethylenically unsaturated monomer may include vinyl chloride, vinyl acetate, vinyl propionate, alkyl acrylate, alkyl methacrylate, acrylic acid, methacrylic acid, and acrylonitrile. The vinylidene chloride copolymer can also be a terpolymer. Vinyl chloride, or ($C_1$-$C_8$)-alkyl (meth)acrylate, such as methyl acrylate, ethyl acrylate or methyl methacrylate, can be used as the comonomers. It is also possible to use a blend of different PVDC such as for instance a blend of the copolymer of vinylidene chloride with vinyl chloride with the copolymer of vinylidene chloride with methyl acrylate. The PVDC may contain suitable additives as known in the art, i.e. stabilizers, antioxidizers, plasticizers, hydrochloric acid scavengers, etc. that may be added for processing reasons or/and to control the gas-barrier properties of the resin.

Ethylene-vinyl alcohol copolymers ("EVOH") are another useful gas-barrier polymers. EVOH typically has an ethylene content of from about 20% by mole to about 44% by mole. It can be employed when a fully coextruded, irradiated structure is manufactured because EVOH withstands irradiation without being degraded, up to a very high energy level. It can be used alone or admixed with one or more polyamides and/or copolyamides.

Polyamides and copolyamides can also be employed alone as gas-barrier resins, e.g. partially aromatic polyamides/copolyamides such as the polyamide formed by polycondensation between methaxylylenediamine and adipic acid (MXD6), and the copolyamide formed from methaxylylenediamine, adipic acid and isophthalic acid (MXD6/MXDI), which have high gas barrier properties.

Once the gas-barrier resin has been selected, its thickness in the starting film will be set to provide for the desired oxygen transmission rate (OTR) in the final deep-drawn package, bearing in mind that the barrier layer will become thinner in the deep-drawing process. High barrier structures will have an OTR below 100 $cm^3$/day.$m^2$.atm such as below 80 $cm^3$/day.$m^2$.atm and will be suitable for meat packaging, including fresh red meat and processed meat. Higher OTR will be preferred for packaging e.g. most of the cheeses where generally OTR of from about 100 to about 500 $cm^3$/day.$m^2$.atm and from about 150 to about 450 $cm^3$/day.$m^2$.atm are preferred.

The thickness of the barrier layer b) in the starting film may range from about 3 to about 15 μm, e.g. from about 4 to about 12 μm, and more preferably from about 5 to about 10 μm, depending on the barrier properties required from the end package and the depth of the deep-drawn container (if the film is used in a deep-drawing process).

The second outer layer c) may comprise any thermoplastic material that might be adapted to function as an abuse layer and that is characterized by a Tg (glass transition temperature) lower than the melting temperature of the first outer heat-sealable layer a), e.g. a Tg lower than the melting temperature of the first outer heat-sealable layer a) by at least 5° C., or by at least 10° C. Said layer may comprise one or more polyolefins, modified polyolefins, polyesters, copolyesters, polyamides, copolyamides, and polystyrene polymers.

Suitable polyolefins that can be used for the second outer layer c) are ethylene homo-polymer, ethylene copolymer, propylene homo-polymer and propylene-copolymer. Examples are ethylene-α-olefin copolymers, particularly those with a density of from about 0.895 to about 0.935 g/$cm^3$, or from about 0.900 and about 0.930 g/$cm^3$; ethylene-vinyl acetate copolymers, particularly those with a vinyl acetate content of from about 4 to about 14% by weight; ionomers; propylene-ethylene copolymers; propylene-ethylene-butene copolymers; propylene-butene-ethylene copolymers; and their blends.

Thermoplastic polyesters may include those obtained from an acid component comprising an aromatic dibasic acid, such as terephthalic acid or isophthalic acid, and a glycol component comprising an aliphatic glycol, an alicyclic glycol or an aromatic glycol, such as ethylene glycol, diethylene glycol or cyclohexane dimethanol. Co-polyesters are formed starting from two or three species of acid component or/and glycol component.

Polyamides and copolyamides that could be used for the second outer layer c) are for instance certain aliphatic or partially aromatic polyamides or copolyamides, such as polyamide 6, MXD6, copolyamide 6,6, copolyamide 6,12, copolyamide MXD6/MXDI, copolyamide 6I/6T, etc.

The second outer layer c) may also comprise polystyrene polymers.

The thickness of said second outer layer c) generally depends on the structure of the film and on the layer composition. As an example in a structure where said outer layer c) is the only layer containing polystyrene polymer, its thickness must be calculated in such a way that the polystyrene polymer amounts to at least 28% of the overall weight of the film. If this second outer layer c) contains polystyrene polymer but there are other layers in the structure containing polystyrene polymer, the thickness of the outer layer is not critical, provided however the total content of the polystyrene polymer is at least 28 wt. % of the whole film. If said outer layer c) contains polymers other than the polystyrene ones, its thickness will generally be comprised between about 2 and about 10 μm, such as between about 3 and about 8 μm, as it will be necessary to provide for bulky inner layers containing polystyrene polymers.

In case the second outer layer c) does not contain polystyrene polymer or not in an amount sufficient to reach the 28 wt. % of the overall film structure, one or more inner layers, positioned between the first outer layer a) and the inner gas-barrier layer b), and/or one or more inner layers positioned between the gas-barrier layer b) and the second outer layer c) will contain polystyrene polymer as defined above.

In one embodiment of the present invention the film will contain at least one layer comprising polystyrene polymer positioned between the heat-sealable layer a) and the gas-barrier layer b).

Additional layers, such as for instance tie layers to improve interlayer adhesion, may be present.

Tie layers may be disposed between the respective layers where a sufficient adhesion is not ensured between adjacent layers. The adhesive resin may comprise one or more polyolefins, one or more modified polyolefins, blends of the above, modified polystyrene polymers, and blend thereof with polystyrene polymers. Examples thereof may include ethylene-vinyl acetate copolymer, ethylene-(meth)acrylate copolymer, or ethylene-c-olefin copolymer, any of the above modified with carboxylic or anhydride functionalities, elastomers, and a blend of these resins, maleic anhydride modified styrene-butadiene copolymers, and blends of maleic anhydride styrene-butadiene copolymers with polystyrene or styrene-butadiene copolymers.

Other layers may also be present in the overall structure such as structural layers to increase the thickness of the overall structure as desired, e.g. typically polyolefin layers, additional gas-barrier layers, etc. as known in the art.

In all the film layers, the polymer components can optionally contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, antistatic agents, anti-fog agents or compositions, and the like additives known to those skilled in the art of packaging films.

The film according to the present invention may be surface printed if desired.

Figure 2:
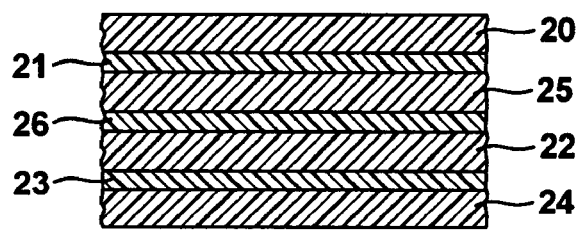
FIG. 2 illustrates an enlarged cross-sectional view of a second film of the present invention.
Figure 3:
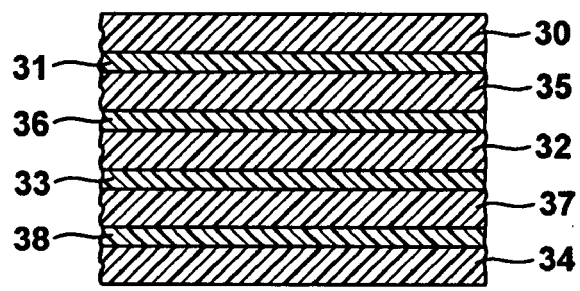
FIG. 3 illustrates an enlarged cross-sectional view of a third film of the present invention.

Representative examples of films according to the present invention are illustrated in FIGS. 1 to 3. FIG. 1 illustrates a first embodiment of a five layer film where 10 is the heat-sealing layer a), 12 is the inner gas-barrier layer b), 14 is the second outer layer c) which comprises polystyrene polymer, and 11 and 13 represent two tie layers that can be equal or different and are used to increase the adhesion of the outer layers to the inner gas-barrier layer. FIG. 2 illustrates a second embodiment of a 7-layer film where 20 is the outer layer a), 22 is the inner gas-barrier layer c), 25 is an inner polystyrene polymer layer, 24 is the second outer layer c) that is a polystyrene polymer layer to bring the total amount of polystyrene polymer to at least 28 wt. % of the overall film and 21, 23, and 26 are tie layers, the composition of which may be equal or different. FIG. 3 illustrates a third embodiment of a 9-layer film where 30 is the first outer layer a), 32 is the inner barrier layer b), 34 is the second outer layer c), 35 and 37 are inner polystyrene polymer layers, whose composition may be equal or different, and 31, 36, 33, and 38 are tie layers.

The films according to the present invention are bi-axially oriented, i.e. oriented in both the MD and TD directions, and bi-axially heat-shrinkable, i.e. they show a free shrink in each direction of at least 5% at 95° C., or at least 10% in each direction.

The free shrink of the film is determined by measuring the percent dimensional change in a 10 cm×10 cm film specimen when subjected to selected heat (i.e., at a temperature of 95° C. in our case) according to ASTM D2732.

The films according to the present invention can be suitably manufactured by the so-called trapped-bubble process, which is a known process typically used for the manufacture of heat-shrinkable films for food contact packaging. According to said process, the multilayer film is co-extruded through a round die to obtain a tube of molten polymeric material which is quenched immediately after extrusion without being expanded, optionally cross-linked, then heated to a temperature which is above the Tg of all the resins employed and below the melting temperature of at least one of the resins employed, typically by passing it through a hot water bath, or alternatively by passing it through an IR (infrared) oven or a hot air tunnel, and expanded, still at this temperature by internal air pressure to get the transversal orientation and by a differential speed of the pinch rolls which hold the thus obtained "trapped bubble", to provide the longitudinal orientation. Typical orientation ratios will be comprised between about 1.5 and about 5 in each direction such as between about 2 and about 4 in each direction. Those skilled in the art will understand that ratios reported herein are with respect to a denominator of 1; thus e.g. "between about 1.5 and about 5" herein refers to between about 1.5:1 and about 5:1.

After being stretched, the film can be cooled while substantially retaining its stretched dimensions to somehow freeze the molecules of the film in their oriented state and rolled for further processing or preferably it will be annealed. Annealing is a well-known process in which the film is heated under controlled tension to a suitably selected temperature, to produce lower shrinkage values as desired for the particular temperature. The annealing step is typically carried out at temperatures that may be e.g. around 40° C., 50° C., 60° C., 70° C., or even higher, provided however the annealed film will still maintain a % free shrink in each direction of at least 5% at 95° C.

Cross-linking is typically obtained by passing the flattened tubing through an irradiation vault where it is irradiated by high-energy electrons. Depending on the characteristics desired, this irradiation dosage can vary from about 20 to about 200 kGy, e.g. from about 30 to about 150 kGy.

Depending on the number of layers in the structure it may be advisable or necessary to split the co-extrusion step: a tube will first be formed of a limited number of layers, with first outer layer a) on the inside of the tube; this tube will be quenched quickly and before submitting it to the orientation step it will be extrusion-coated with the remaining layers, again quenched quickly, optionally cross-linked, and then passed to the orientation step. During extrusion-coating the tube will be slightly inflated just to keep it in the form of a tube and avoid that it collapses.

The coating step can be simultaneous, by coextruding all the remaining layers altogether, so as to simultaneously adhere all of them, one over the other, to the quenched tube obtained in the first coextrusion step, or this coating step can be repeated as many times as the number of layers which are to be added.

The extrusion-coating step is clearly also required when a film only partially cross-linked is desired. As an example, in the case of barrier structures comprising a PVDC layer that might be degraded/discoloured by irradiation, it might be desirable to avoid cross-linking of the PVDC layer. In this case the irradiation step will be performed after the extrusion of the first group of layers, which would not comprise the PVDC barrier layer, and before extrusion coating.

Alternatively, the film according to the present invention may be obtained by flat extrusion (co-extrusion or extrusion coating) and biaxial stretching by a simultaneous or a sequential tenter process.

Still alternatively the film according to the present invention may be obtained by heat- or adhesive-lamination of the separately obtained webs each containing only part of the film sequence of layers, followed by orientation of the obtained overall structure.

The films of the present invention are particularly suitable for use in the so-called "thermoform-shrink" processes as deep-drawable films. In such a case the thickness of the film will typically be between about 40 and about 160 μm, depending on the depth desired for the formed container. For medium depths a thickness will be generally in the range between 50 and 100 μm, while for high depths a thickness will be typically in the range between 70 and 160 μm.

The films of the present invention, particularly in the embodiments where the second outer layer c) comprises a high melting resin that is adapted to be in contact with a sealing bar during a heat sealing operation without sticking, can be used also as the lidding film that closes the package. If also the lid is deep-drawn, then the same thickness range will be appropriate, while if the film is sealed to the flange of the deep-drawn container as a flat lid, a thickness of between about 20 and about 35 μm will be sufficient and if it has to be stretched to a certain extent, because the product loaded into the deep-drawn container slightly protrudes therefrom, then a thickness of e.g., from about 25 to about 40 μm, will be suitable.

If no deep-drawing of the lid is required however any type of gas-barrier heat-shrinkable film can be employed for the lidding film provided its heat-sealing layer can be heat-sealed to the first outer sealing layer a) of the film of the invention and provided its outer abuse layer does not stick to the heat-sealing bars.

The films of the present invention can be employed also for other packaging applications, in particular for any packaging application where a shrink thermoplastic material can be employed, such as shrink wrapping, shrink bag, etc. For these uses the film may have a thickness ranging from about 20 to about 120 μm, e.g. between 20 and 40 μm for shrink film applications and between 40 and 120 μm for shrink bag or tubing applications.

The following examples are presented for the purpose of further illustrating and explaining the present invention in its film first object and are not to be taken as limiting in any regard. Unless otherwise indicated, all parts and percentages are by weight.

In the following examples the resins indicated in Table I below have been employed:

TABLE I

| | |
|---|---|
| PS1 | Styrene-butadiene copolymer - STYROLUX ™ 684D by BASF |
| PS2 | Polystyrene - POLYSTYROL ™ 143E by BASF |
| EPBT | Ethylene-propylene-butene terpolymer - MI 5 g/10 min (230° C./2.16 Kg) and m.p. 131° C. - ELTEX ™ PKS 359 by Solvay |
| EC1 | Heterogeneous ethylene-α-olefin copolymer with d = 0.905 g/cm$^3$ and MI = 1 g/10 min - ATTANE ™ SL4102 by Dow |
| EC2 | Homogeneous ethylene-α-olefin copolymer with d = 0.918 g/cm$^3$ and MI = 2 g/10 min - EXCEED ™ 2018CA by ExxonMobil |
| EC3 | Heterogeneous ethylene-α-olefin copolymer with d = 0.905 g/cm$^3$ and MI = 1 g/10 min - ATTANE ™ 4203 by Dow |
| EC4 | Ethylene-norbornene copolymer - TOPAS ™ 8007 F-04 by Ticona |
| EC5 | Heterogeneous ethylene-α-olefin copolymer with d = 0.911 g/cm$^3$ and MI = 6 g/10 min - STAMYLEX ™ 08-076F by DSM |
| EC6 | Homogeneous ethylene-α-olefin copolymer with d = 0.904 g/cm$^3$ and MI = 1 g/10 min - AFFINITY ™ PL1881 by Dow |
| EC7 | Heterogeneous ethylene-α-olefin copolymer with d = 0.920 g/cm$^3$ and MI = 1 g/10 min - DOWLEX ™ 2045E by Dow |
| EVA1 | Ethylene-vinyl acetate copolymer (14 wt. % VA – MI = 0.3 g/10 min) - ESCORENE ™ FL00014 by ExxonMobil |
| EVA2 | Ethylene-vinyl acetate copolymer (14 wt. % VA – MI = 0.3 g/10 min) - 1003VN4 ™ by Total |
| ION | Ionomer (Na methacrylate) - IOTEK ™ 3110 by ExxonMobil |
| EPDM | Ethylene-propylene-diene terpolymer d = 0.870 g/cm$^3$ (79% by weight Et, 6% by weight ENB) - VISTALON ™ 7800 by ExxonMobil |
| EMAA | Ethylene-methacrylic acid copolymer (12 wt. % MA – MI = 1.4 g/10 min ) NUCREL ™ 1202 by DuPont |
| PET | Polyethylene-terephthalate copolymer - EASTAR ™ PETG 6763 by Eastman |
| PA1 | PA 6/12 - m.p. 130° C. - GRILON ™ CF6S by EMS-Chemie |
| PA2 | PA MXD6 - PA 6121 ™ by Mitsubishi |
| PA3 | PA MXD6/MXDI - GRIVORY ™ HB5299 by EMS-Chemie |
| AD1 | Acid/acrylate modified EVA - BYNEL ™ 3101 by DuPont |
| AD2 | Rubber modified maleic anhydride grafted LLDPE - PX 3227 ™ by Equistar |
| AD3 | Maleic anhydride modified LLDPE - BYNEL ™ 4104 by DuPont |
| PVDC | Stabilized PVDC - IXAN ™ PV 910 |
| EVOH | EVOH - EVAL ™ SP292B by Kuraray |

Melt Flow Indexes (MI's) are measured by ASTM D-1238 and are reported in grams/10 minutes.
Unless otherwise indicated the conditions used are 190° C./2.16 kg.
Unless otherwise specifically indicated, all percentages are by weight.

EXAMPLES 1 TO 5

Eight layer structures have been prepared by coextrusion of a substrate consisting of the first four layers, starting with the first outer layer a), followed by quenching of the extruded four layer tubular film, irradiation at 64 kGy and extrusion coating thereof with a gas-barrier layer b) and the remaining layers up to the second outer layer c). The obtained tube is then rapidly cooled and biaxially oriented by passing it through a hot water bath (about 95-98° C.), then inflating to get transverse orientation and stretching to get longitudinal orientation. The orientation ratios were as indicated. The films were annealed at 45° C. The resins used for the different layers, the partial thickness of each layer and the stretching ratios applied are reported in following Table II.

EXAMPLES 6 TO 17

Eight layer structures have been prepared following substantially the process described above with the only difference that only the structure of Example 6 was annealed at 50° C., while the others were not annealed.

The resins used for the different layers of the structures of examples 6 to 17, the thickness of each layer, and the stretching ratios are reported in following Table III.

TABLE II

| Ex. no. | Layer a) | 2nd layer | 3rd layer | 4th layer | layer b) | 6th layer | 7th layer | 8th layer | Stretch, ratios MD × TD |
|---|---|---|---|---|---|---|---|---|---|
| 1 | 95% EC3 + 5% EC4 (17.2 μm) | 80% EVA2 + 20% EC7 (11.2 μm) | PS1 (17.2 μm) | 80% EVA2 + 20% EC7 (11.2 μm) | PVDC (6.0 μm) | EVA2 (4.3 μm) | PS1 (17.2 μm) | 50% EPBT + 50% EVA2 (4.3 μm) | 3.9 × 3.4 |
| 2 | 95% EC3 + 5% EC4 (8.4 μm) | 80% EVA2 + 20% EC7 (15.2 μm) | PS1 (25.3 μm) | 80% EVA2 + 20% EC7 (15.2 μm) | PVDC (5.9 μm) | EVA2 (8.4 μm) | 50% AD1 + 50% AD2 (4.2 μm) | PA1 (4.2 μm) | 3.6 × 3.7 |
| 3 | 95% EC1 + 5% EC4 (16.4 μm) | EVA2 (11.5 μm) | PS1 (16.4 μm) | EVA2 (11.5 μm) | PVDC (5.7 μm) | EVA2 (6.2 μm) | EVA2 (6.2 μm) | PS1 (16.4 μm) | 3.8 × 3.8 |
| 4 | 95% EC1 + 5% EC4 (22.0 μm) | EVA2 (15.4 μm) | PS1 (22.0 μm) | EVA2 (15.4 μm) | PVDC (7.7 μm) | EVA2 (8.3 μm) | EVA2 (8.3 μm) | PS1 (22.0 μm) | 3.2 × 3.4 |
| 5 | 95% EC1 + 5% EC4 (13.0 μm) | EVA2 (8.5 μm) | PS1 (12.6 μm) | EVA2 (8.5 μm) | PVDC (5.7 μm) | EVA2 (4.5 μm) | EVA2 (4.9 μm) | PS1 (12.6 μm) | 3.8 × 3.8 |

TABLE III

| Ex. no. | Layer a) | 2nd layer | 3rd layer | 4th layer | layer b) | 6th layer | 7th layer | 8th layer | Stretch ratios MD × TD |
|---|---|---|---|---|---|---|---|---|---|
| 6 | 95% EC1 + 5% EC4 (17.1 μm) | EVA2 (12.0 μm) | PS1 (17.1 μm) | EVA2 (12.0 μm) | PVDC (7.0 μm) | EVA2 (4.3 μm) | PS1 (10.7 μm) | PS1 (10.7 μm) | 3.6 × 3.7 |
| 7 | 95% EC1 + 5% EC4 (17.1 μm) | 80% EVA2 + 20% EC2 (12.0 μm) | PS1 (17.1 μm) | 80% EVA2 + 20% EC2 (12.0 μm) | PVDC (6.0 μm) | EVA2 (4.3 μm) | PS1 (10.7 μm) | PS1 (10.7 μm) | 3.6 × 3.7 |
| 8 | 95% EC1 + 5% EC2 (17.1 μm) | 80% EVA2 + 20% EC2 (12.0 μm) | PS1 (17.1 μm) | 80% EVA2 + 20% EC2 (12.0 μm) | PVDC (6.0 μm) | EVA2 (4.3 μm) | PS1 (10.7 μm) | PS1 (10.7 μm) | 3.6 × 3.7 |
| 9 | 95% EC1 + 5% EC4 (17.1 μm) | 80% EVA2 + 20% EC7 (12.0 μm) | PS1 (17.1 μm) | 80% EVA2 + 20% EC7 (12.0 μm) | PVDC (6.0 μm) | EVA2 (4.3 μm) | PS1 (10.7 μm) | PS1 (10.7 μm) | 3.6 × 3.7 |
| 10 | 95% EC3 + 5% EC4 (17.1 μm) | 80% EVA2 + 20% EC7 (12.0 μm) | 80% PS1 + 20% PS2 (17.1 μm) | 80% EVA2 + 20% EC7 (12.0 μm) | PVDC (6.0 μm) | EVA2 (4.3 μm) | 80% PS1 + 20% PS2 (10.7 μm) | 80% PS1 + 20% PS2 (10.7 μm) | 3.6 × 3.7 |
| 11 | 95% EC1 + 5% EC4 (17.1 μm) | 80% EVA2 + 20% EC7 (12.0 μm) | PS1 (17.1 μm) | 80% EVA2 + 20% EC7 (12.0 μm) | PVDC (6.0 μm) | EVA2 (4.3 μm) | 80% PS1 + 20% PS2 (10.7 μm) | 80% PS1 + 20% PS2 (10.7 μm) | 3.6 × 3.7 |
| 12 | 95% EC1 + 5% EC4 (17.0μpm) | 80% EVA2 + 20% EC7 (10.3 μm) | PS1 (15.8 μm) | 80% EVA2 + 20% EC72 (10.3 μm) | PVDC (5.9 μm) | EVA2 (4.0 μm) | PS1 (11.9 μm) | PS1 (11.9 μm) | 3.6 × 4.0 |
| 13 | 95% EC1 + 5% EC4 (17.0 μm) | 80% EVA2 + 20% EC7 (10.3 μm) | PS1 (15.8 μm) | 80% EVA2 + 20% EC7 (10.3 μm) | PVDC (5.9 μm) | EVA2 (4.0 μm) | PS1 (11.9 μm) | PS1 (11.9 μm) | 3.6 × 4.0 |
| 14 | 95% EC1 + 5% EC4 (15.8 μm) | 80% EVA2 + 20% EC4 (11.2 μm) | PS1 (15.8 μm) | 80% EVA2 + 20% EC4 (11.1 μm) | PVDC (5.5 μm) | EVA2 (4.0 μm) | PS1 (7.9 μm) | PS1 (7.9 μm) | 3.3 × 4.0 |
| 15 | EMAA (17.2 μm) | 80% EVA2 + 20% EC7 (12.1 μm) | PS1 (17.2 μm) | 80% EVA2 + 20% EC7 (12.1 μm) | PVDC (6.0 μm) | EVA2 (4.3 μm) | PS1 (8.6 μm) | PS1 (8.6 μm) | 3.3 × 4.0 |
| 16 | 95% EC1 + 5% EC4 (8.6 μm) | EVA1 (12.1 μm) | PS1 (17.2 μm) | EVA1 (12.1 μm) | PVDC (6.0 μm) | EVA1 (4.3 μm) | PS1 (12.9 μm) | PS1 (12.9 μm) | 3.3 × 4.0 |
| 17 | 95% EC1 + 5% EC4 (16.3 μm) | EVA1 (11.4 μm) | PS1 (16.3 μm) | EVA1 (11.4 μm) | PVDC (5.7 μm) | EVA1 (4.1 μm) | PS1 (12.2 μm) | PS1 (12.2 μm) | 3.5 × 4.0 |

EXAMPLES 18-19

Six layer films having the sequence of layers indicated in following Table IV have been co-extruded without irradiation and oriented with stretching ratios of 2.9 (MD)×3.0 (TD). The films have not been annealed.

TABLE IV

| Ex. no | Outer layer a) | 2$^{nd}$ layer | 3$^{rd}$ layer | Barrier b) | 5$^{th}$ layer | Outer layer c) |
|---|---|---|---|---|---|---|
| 18 | 50% EVA1 + 50% EC1 (25.8 μm) | PS1 (27.1 μm) | AD3 (6.5 μm) | EVOH (5.2 μm) | AD3 (6.5 μm) | PS1 (19.4 μm) |
| 19 | 50% EVA1 + 50% EC1 (25.8 μm) | PS1 (27.1 μm) | AD3 (6.5 μm) | EVOH (5.2 μm) | AD3 (6.5 μm) | ION (19.4 μm) |

EXAMPLES 20-22

The films reported in Table V below might be obtained by following essentially the same procedure as in Example 18.

TABLE V

| Ex. No. | Outer layer a) | 2$^{nd}$ layer | 3$^{rd}$ layer | 4$^{th}$ layer | Barrier layer b) | Outer layer c) |
|---|---|---|---|---|---|---|
| 20 | 50% EVA1 + 50% EC1 (25.8 μm) | PS1 (27.1 μm) | PS1 (27.1 μm) | 50% AD1 + 50% AD3 (6.5 μm) | EVOH (5.2 μm) | PA1 (5.2 μm) |
| 21 | 50% EVA1 + 50% EC1 (25.8 μm) | PS1 (27.1 μm) | PS1 (27.1 μm) | 50% AD1 + 50% AD3 (6.5 μm) | EVOH (5.2 μm) | PA2 (5.2 μm) |
| 22 | 50% EVA1 + 50% EC1 (25.8 μm) | PS1 (27.1 μm) | PS1 (27.1 μm) | 50% AD1 + 50% AD3 (6.5 μm) | EVOH (5.2 μm) | PA3 (5.2 μm) |

EXAMPLES 23-25

The films of following Table VI might be prepared by following essentially the same procedure described in Examples 1 to 5.

TABLE VI

| Ex. No. | Outer layer a) | 2$^{nd}$ layer | 3$^{rd}$ layer | 4$^{th}$ layer | Barrier layer b) | 6$^{th}$ layer | 7$^{th}$ layer | Outer layer c) |
|---|---|---|---|---|---|---|---|---|
| 23 | EC5 (8 μm) | 80% EVA2 20% EC7 (10 μm) | PS1 (26 μm) | 80% EVA2 20% EC7 (10 μm) | PVDC (6 μm) | EVA2 (10 μm) | AD1 (4 μm) | PA2 (6 μm) |
| 24 | EC6 (9 μm) | 80% EVA2 20% EC7 (10 μm) | PS1 (25 μm) | 80% EVA2 20% EC7 (8 μm) | PVDC (5 μm) | EVA2 (8 μm) | 50% EVA2 50% AD1 (8 μm) | PET (7 μm) |
| 25 | EC5 (10 μm) | 60% EVA2 40% EC4 (8 μm) | 80% PS1 20% PS2 (26 μm) | EVA2 (8 μm) | PVDC (6 μm) | EVA2 (8 μm) | 50% EVA2 50% AD1 (8 μm) | PET (6 μm) |

In FIG. 4 it is schematically illustrated a "thermoform-shrink" process. For use in said process the film according to the present invention indicated by the numeral 1, in the form of a webstock, is laterally gripped (not shown in the Figure) by circulating strands of chains and guided from the line input towards the deep-drawing station A. In said station once the heating plate 101 has heated the film to a temperature sufficient to soften it, the heat-softened thermo-plastic film is deep-drawn in the mold 100. Heating can be done by radiation (e.g., infrared radiation), convection, conduction or any combination of these methods. The temperature reached by the film should be high enough to allow it to form well but not too high as otherwise it may flow excessively. Typically with the film according to the present invention a temperature around 95-105° C. is employed. In the basic forming method the primary force causing the softened plastic film to come into contact with the mold is the difference in pressure between the two sides of the plastic sheet. This can be obtained either applying a vacuum in the mold through the ports indicated in FIG. 5 with the numerals 201 and/or by causing compressed air from the ports 202 of FIG. 5 to force the softened plastic into contact with the mold. In this latter case ports 201 are anyway needed to evacuate the air trapped by the film in the mold. Other methods might be used in this forming step, such as for instance the plug assist thermo-forming method but it appears that for thin films like the heat-shrinkable films according to the present invention there is no need to use these more sophisticated methods. The mold may be a single or a multiple one and the shape of each cavity may vary as desired. Molds with a depth of e.g. from about 40 to about 140 mm can be used. Once the forming step in station A is completed, the mold 100 is lowered and the formed containers 2, still joined together by the plastic web laterally gripped, are guided along the packaging line to a loading station B where they are loaded, either manually or automatically, with the product to be packaged 3. Then the loaded containers are moved to a vacuum sealing chamber C where an upper film 4 is supplied on top of the loaded container 5. The vacuum-sealing chamber C is made by a lower part 102 and an upper part 103 which are movable in a reciprocating manner in the direction of the arrows to close the chamber. Once the chamber is closed, the space within the chamber is evacuated, including the space between the loaded deep-drawn container 5 and the upper film 4 and a sealing frame (not shown in FIG. 4) is then actuated to seal the two along the flange of the deep-drawn container. If the product loaded into the deep-drawn container protrudes above the plane of the flange of the container, the upper film 4 will have either to be deep-drawn similarly to the lower one, or stretched over the top surface of the product. In both cases the upper film will have to be laterally gripped by strands of circulating chains. In the former case, a forming station as described above but providing for an inverted deep-drawn container will be present upstream the vacuum sealing station C to deep-draw the upper lidding film. The mold used in this case will have the same shape as that used for the lower film but not necessarily the same depth, and the deep-drawn container and the deep-drawn lid obtained from the upper film 4, will enter into the vacuum-sealing station C in such a way that once the chamber is evacuated, their flanges will overlap. In the latter case it will be sufficient to heat the gripped upper film before guiding it into the vacuum-sealing chamber to allow its easy stretching. Heating can be obtained by contacting the film with a heating plate 104 or by any other known means.

Once the package is sealed in the vacuum-sealing chamber C, air is restored in the chamber and the chamber is opened. The packages 6 are separated, either inside or outside the vacuum chamber by means e.g. of cutting knives and then conveyed to a shrink station E, where they are submitted to a heat treatment that shrinks the packaging material and gives the tight appearance to the end packages 7. For instance a water bath, a hot air tunnel or an IR heater, could suitably be employed in this step.

Representative films according to the present invention have been evaluated in the deep-drawing step of the above-described process. The features that have been evaluated were the formability (i.e., the depth reached in the mold and how precisely the shape of the formed container corresponded to the shape of the mold (any "shrink-back" effect and the so-called "pouch definition")), the mechanical properties of the deep-drawn container and the shrink properties of the deep drawn container (i.e., % free shrink, shrink tension, and residual shrink tension). In particular the films of Examples 3, 7, and 11 have been deep drawn to a depth of 100 mm. While formability was evaluated visually by the operator and judged very good for all the three films, the % free shrink at 85° C. (ASTM 2732), the shrink tension at the same temperature and the residual (or cold) shrink tension following heating at the given temperature (ASTM 2838) have been evaluated on the formed films by the ASTM methods indicated between parentheses. The mechanical properties have been evaluated by measuring the puncture resistance of the deep-drawn container at 30° C. by an internal test method that is described shortly below: a sample (6.5×6.5 cm) of the deep-drawn container (from the base) is fixed in a specimen holder connected to a compression cell mounted on a dynamometer (an Instron tensile tester); when the dynamometer is started, a punch (a punching sphere, 5-mm in diameter soldered on a plunger) is brought against the film sample at a constant speed (30 cm/min) at a temperature of 30° C., and the force needed to puncture the sample is thus determined.

The results obtained are reported in following Table VII

TABLE VII

| Properties after thermoforming | Film of Example 3 | Film of Example 7 | Film of Example 11 |
| --- | --- | --- | --- |
| % free shrink (85° C.) | 28 (MD)/32(TD) | 34 (MD)/37(TD) | 30 (MD)/34(TD) |
| Shrink tension (85° C.) (kg/cm$^2$) | 18 (MD)/25(TD) | 26 (MD)/26(TD) | 26 (MD)/34(TD) |
| Residual shrink tension (g) (85° C.) | 86 (MD)/120(TD) | 135 (MD)/140(TD) | 135 (MD)/190(TD) |
| Puncture (g) - 30° C. | not determined | 3800 (3600-4000) | 3000 (2700-3200) |

What is claimed is:

1. A multi-layer, gas-barrier, biaxially oriented and heat-shrinkable film comprising:
   a) a first outer heat-sealable layer;
   b) an inner gas-barrier layer; and
   c) a second outer abuse resistant layer;
   said film being characterized in that it contains at least 28%, by weight of the film, of polystyrene polymer,
      wherein the film comprises one or more inner layers positioned between the inner gas-barrier layer and the second outer abuse resistant layer;
   wherein the polystyrene polymer is present in
      i) the second outer abuse resistant layer, or
      ii) at least one inner layer positioned between the inner gas-barrier layer and the second outer abuse resistant layer, or
      iii) both the second outer abuse resistant layer and at least one inner layer positioned between the inner gas-barrier layer and the second outer abuse resistant layer;
   wherein at least 50 wt. % of the total amount of polystyrene polymer in the film is in the form of a styrene-butadiene copolymer.

2. The multi-layer, gas-barrier, biaxially oriented and heat-shrinkable film of claim 1 wherein the styrene-butadiene copolymer comprises between 55 and 95 wt. % of a styrene component, based on the weight of the copolymer.

3. The multi-layer, gas-barrier, biaxially oriented and heat-shrinkable film of claim 1 wherein at least 60 wt. % of the total amount of polystyrene polymer in the film is in the form of a styrene-butadiene copolymer.

4. The multi-layer, gas-barrier, biaxially oriented and heat-shrinkable film of claim 1 wherein the inner gas-barrier layer is a PVDC layer.

5. The multi-layer, gas-barrier, biaxially oriented and heat-shrinkable film of claim 1 wherein the first outer heat-sealable layer comprises one or more materials selected from the group consisting of one or more of polyethylenes having a den- sity of from about 0.900 g/cm$^3$ to about 0.950 g/cm$^3$, and heterogeneous or homogeneous ethylene-α-olefin copolymer having a density of from about 0.880 g/cm³ to about 0.945 g/cm³.

6. The multi-layer, gas-barrier, biaxially oriented and heat-shrinkable film of claim 1 wherein the second outer abuse resistant layer comprises one or more materials selected from the group consisting of one or more polyolefins, modified polyolefins, polyesters/copolyesters, polyamides/ copolyamides, and polystyrene polymers.

7. A multi-layer, gas-barrier, biaxially oriented and heat-shrinkable film comprising:
 a) a first outer heat-sealable layer;
 b) an inner gas-barrier layer; and
 c) a second outer abuse resistant layer;
 said film being characterized in that it contains at least 28%, by weight of the film, of polystyrene polymer,
  wherein the film comprises one or more inner layers positioned between the first outer heat-sealable layer and the inner gas-barrier layer;
 wherein the polystyrene polymer is present in
  i) the second outer abuse resistant layer, or
  ii) at least one inner layer positioned between the first outer heat-sealable layer and the inner gas-barrier layer, or
  iii) both the second outer abuse resistant layer and at least one inner layer positioned between the first outer heat-sealable layer and the inner gas-barrier layer;
 wherein at least 50 wt.% of the total amount of polystyrene polymer in the film is in the form of a styrene-butadiene copolymer.

8. The multi-layer, gas-barrier, biaxially oriented and heat-shrinkable film of claim 7 wherein the styrene-butadiene copolymer comprises between 55 and 95 wt. % of a styrene component, based on the weight of the copolymer.

9. The multi-layer, gas-barrier, biaxially oriented and heat-shrinkable film of claim 7 wherein at least 60 wt. % of the total amount of polystyrene polymer of the film is in the form of a styrene-butadiene copolymer.

10. The multi-layer, gas-barrier, biaxially oriented and heat-shrinkable film of claim 7 wherein the inner gas-barrier layer is a PVDC layer.

11. The multi-layer, gas-barrier, biaxially oriented and heat-shrinkable film of claim 7 wherein the first outer heat-sealable layer comprises one or more materials selected from the group consisting of one or more of polyethylenes having a density of from about 0.900 g/cm³ to about 0.950 g/cm³, and heterogeneous or homogeneous ethylene-α-olefin copolymer having a density of from about 0.880 g/cm³ to about 0.945 g/cm³.

12. The multi-layer, gas-barrier, biaxially oriented and heat-shrinkable film of claim 7 wherein the second outer abuse resistant layer comprises one or more materials selected from the group consisting of one or more polyolefins, modified polyolefins, polyesters/copolyesters, polyamides/ copolyamides, and polystyrene polymers.

* * * * *